US007664343B2

(12) United States Patent
Withum et al.

(10) Patent No.: US 7,664,343 B2
(45) Date of Patent: Feb. 16, 2010

(54) MODIFIED LEVENSHTEIN DISTANCE ALGORITHM FOR CODING

(75) Inventors: Timothy O. Withum, Olney, MD (US); Kurt P. Kopchik, Washington, DC (US); Oren I. Oxman, Rockville, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 635 days.

(21) Appl. No.: 11/338,506

(22) Filed: Jan. 23, 2006

(65) Prior Publication Data

US 2007/0172124 A1 Jul. 26, 2007

(51) Int. Cl.
G06K 9/03 (2006.01)
G06K 9/72 (2006.01)
(52) U.S. Cl. ...................... 382/310; 382/231
(58) Field of Classification Search .......... 382/229, 382/231, 310; 715/257
See application file for complete search history.

(56) References Cited

U.S. PATENT DOCUMENTS

| 5,329,598 | A | | 7/1994 | Geist |
| 5,459,739 | A | * | 10/1995 | Handley et al. ............. 714/797 |
| 5,519,786 | A | | 5/1996 | Courtney et al. |
| 5,805,747 | A | * | 9/1998 | Bradford ..................... 382/310 |
| 5,850,480 | A | * | 12/1998 | Scanlon ...................... 382/229 |
| 6,219,453 | B1 | | 4/2001 | Goldberg |
| 6,377,945 | B1 | | 4/2002 | Risvik |
| 6,885,758 | B1 | * | 4/2005 | Bayer ......................... 382/101 |
| 7,047,493 | B1 | * | 5/2006 | Brill et al. .................... 715/257 |
| 7,092,567 | B2 | * | 8/2006 | Ma et al. ..................... 382/177 |
| 7,254,774 | B2 | * | 8/2007 | Cucerzan et al. ............. 715/257 |
| 7,292,975 | B2 | * | 11/2007 | Lovance et al. ............. 704/235 |
| 2002/0021838 | A1 | | 2/2002 | Richardson et al. |
| 2003/0014448 | A1 | | 1/2003 | Castellanos et al. |
| 2004/0141354 | A1 | | 7/2004 | Carnahan |
| 2004/0210551 | A1 | | 10/2004 | Jones et al. |
| 2005/0123203 | A1 | | 6/2005 | Heilper et al. |

OTHER PUBLICATIONS

Dengel et al. (Dec. 1997) "Techniques for improving OCR results." Chapter 8, Handbook of Character Recognition and Document Image Analysis, Bunke et al., Eds., pp. 227-258.*

(Continued)

*Primary Examiner*—Bhavesh M Mehta
*Assistant Examiner*—Barry Drennan
(74) *Attorney, Agent, or Firm*—Marsh Fischmann & Breyfogle LLP

(57) ABSTRACT

Methods and systems of mapping of an optical character recognition (OCR) text string to a code included in a coding dictionary by supplementing the Levenshtein Distance Algorithm (LDA) with additional information in the form of adjustments based on particular character substitutions, insertions and deletions together with weighting based on multiple alternatives for the OCR text string. In one embodiment, an OCR text string mapping method (100) includes receiving (110) an OCR text string, comparing (120) it with selected text strings from a coding dictionary, computing (130) modified Levenshtein distances associated with the comparisons by determining (140) substitution penalties, determining (150) insertion penalties, determining (160) deletion penalties and combining (170) the penalties, selecting (180) the best matching text string from the coding dictionary based on the modified Levenshtein distances, determining (190) whether a maximum threshold distance is met, and assigning (200) a code associated with the best matching text string to the OCR text string when met, and assigning (210) a null or no code when not met.

11 Claims, 7 Drawing Sheets

OTHER PUBLICATIONS

"ZIP code." (Jan. 2005) Wikipedia.*

Geist et al. (Jun. 1993) "The Second Census Optical Character Recognition Systems Conference: Call for Participation," National Institute of Standards and Technology.*

Search Report Under Section 17(5). UK Intellectual Property Office. Application No. GB0701002.8. Mailing Date May 17, 2007.

Levenshtein Distance. Wikipedia. http://web.archive.org/web/20060118071833/http://en.wikipedia.org/wiki/Levenshtein_distance. Jan. 18, 2006.

* cited by examiner

FIG. 2

| OCR TEXT STRING CHARACTERS | CODING DICTIONARY TEXT STRING CHARACTERS | | | | | | | | | | | | |
|---|---|---|---|---|---|---|---|---|---|---|---|---|---|
| | A | B | C | D | E | F | G | H | I | J | K | L | ... |
| A | 0 | 3 | 3 | 3 | 3 | 3 | 1 | 3 | 3 | 3 | 3 | 3 | ... |
| B | 3 | 0 | 3 | 3 | 3 | 3 | 3 | 3 | 3 | 3 | 3 | 3 | ... |
| C | 3 | 3 | 0 | 3 | 1 | 3 | 3 | 3 | 3 | 3 | 3 | 1 | ... |
| D | 3 | 3 | 3 | 0 | 3 | 0 | 3 | 3 | 3 | 3 | 3 | 3 | ... |
| E | 3 | 3 | 1 | 3 | 0 | 3 | 3 | 3 | 1 | 3 | 3 | 3 | ... |
| F | 3 | 3 | 3 | 3 | 3 | 1 | 0 | 0 | 3 | 3 | 3 | 3 | ... |
| G | 1 | 3 | 3 | 3 | 3 | 3 | 3 | 3 | 3 | 3 | 3 | 3 | ... |
| H | 3 | 3 | 3 | 3 | 3 | 3 | 3 | 0 | 0 | 3 | 3 | 0 | ... |
| I | 3 | 3 | 3 | 3 | 3 | 3 | 3 | 3 | 3 | 0 | 3 | 3 | ... |
| J | 3 | 3 | 3 | 3 | 3 | 3 | 3 | 3 | 0 | 3 | 0 | 3 | ... |
| K | 3 | 3 | 3 | 3 | 3 | 3 | 3 | 3 | 3 | 3 | 3 | 0 | ... |
| L | ... | ... | ... | ... | ... | ... | ... | ... | ... | ... | ... | ... | ... |

| 350 | A | B | C | D | E | ... | Z | . | , | ; | - | ~ | ... |
|---|---|---|---|---|---|---|---|---|---|---|---|---|---|
| | 5 | 5 | 5 | 5 | 5 | ... | 5 | 1 | 1 | 2 | 1 | 5 | ... |

INSERTED CHARACTER IN OCR TEXT STRING (352, 354)

FIG. 3

| 460 | A | B | C | D | E | ... | Z | . | , | ; | - | ~ | ... |
|---|---|---|---|---|---|---|---|---|---|---|---|---|---|
| | 5 | 5 | 5 | 5 | 5 | ... | 5 | 1 | 1 | 3 | 1 | 4 | ... |

DELETED CHARACTER FROM OCR TEXT STRING (462, 464)

FIG. 4

MODIFIED LEVENSHTEIN DISTANCE ALGORITHM FOR CODING

GOVERNMENT INTERESTS

This invention was made with Government support under Contract No. 50-YABC-7-66010 awarded by the Bureau of the Census. The Government has certain rights in this invention.

FIELD OF THE INVENTION

The present invention relates generally to optical character recognition, and more particularly to mapping text strings generated via optical character recognition to categories represented by text strings included in a coding dictionary.

BACKGROUND OF THE INVENTION

Large surveys, such as census population surveys, often utilize forms on which respondents enter information in response to various survey questions by hand. The survey forms are then electronically scanned and optical character recognition (OCR) software is utilized to transform the handwritten text responses into electronic data (referred to herein as OCR text strings). The OCR text strings may, in general, include any combination of one or more characters or symbols, and the term character is used herein to refer to both characters and symbols output by OCR software.

In order to facilitate compilation and analysis of the data, a coding process may be undertaken wherein the OCR text strings are mapped to various categories and assigned codes (e.g., numeric, alpha, or alpha-numeric codes) associated with the categories. The categories may be represented by text strings included in a coding dictionary. The text strings may, in general, include any combination of one or more characters and symbols. In order to map an OCR text string to a category, the OCR text string is compared with text strings in the coding dictionary in order to identify which text string in the coding dictionary the OCR text string most closely resembles, if any. Such comparison may be based on a technique known as the Levenshtein Distance Algorithm (LDA). The LDA involves the computation of a numeric value referred to as the Levenshtein distance (also sometimes referred to as the edit distance) representing how many changes must be made to a particular text string in order to make it identical to another text string with which it is compared. For example, if the OCR software interprets an entry on a census survey form as "GLEEN!WORD V.LLAG" and such OCR text string is compared with the text string from the coding dictionary "GREENWOOD VILLAGE", three character substitutions (a "L" for the "R" and a "R" for an "O" in the first word and a "." for the "I" in the second word), one character deletion (an "E" missing at the end of the second word), and one character insertion (the "!" between the "N" and the "W" in the first word) are present, and hence such comparison is assigned a Levenshtein distance of five.

Unfortunately, accurately mapping the OCR text strings to the appropriate text strings included in the coding dictionary using the LDA is complicated by the fact that the OCR text strings often include errors due to the inherent difficulties present in performing optical character recognition of handwritten text. Such errors (e.g., incorrectly recognized characters, inserted or noise characters, and/or deleted characters) can result in inaccurate Levenshtein distances when comparing the OCR text strings with text strings in the coding dictionary using the LDA. Inaccuracies in the Levenshtein distances reduce confidence that the OCR text strings have been accurately mapped to the proper text strings in the coding dictionary and can lead to assignment of improper codes thus reducing the usefulness of the collected survey data.

SUMMARY OF THE INVENTION

Accordingly, the present invention achieves improved accuracy in the mapping of an OCR text string to a code included in a coding dictionary by supplementing the LDA with additional information. The present invention employs a combination of two techniques to obtain an modified Levenshtein distance for the OCR text string. The first technique involves the use of matrices to adjust the Levenshtein distance in accordance with specific character substitutions, insertions and/or deletions within the OCR text string to account for common errors made by OCR software. The second technique involves the use of multiple alternative choices for the OCR characters (referred to herein as backup characters) when available from the OCR software and weighting of the modified Levenshtein distance obtained using each choice based on the level of the alternative choice, the number of backup characters in the alternative choice, and characteristics of the backup characters included in the alternative(s).

The combination of the foregoing techniques achieves a modified LDA that provides improved coding results when assigning codes to OCR text, such as during processing and analysis of large surveys (e.g., a population census). The present invention accounts for common OCR errors and allows for multiple OCR choices enabling more scanned text to be correctly matched to its appropriate code. Rather than applying the same fixed penalty for character substitutions, the present invention provides the ability to vary the distance penalty for specific character substitutions thereby permitting characters that OCR software commonly mistakes for others to be given a lower distance penalty than character substitutions that do not commonly occur. The Levenshtein distance penalties are also varied depending on whether the characters were inserted, deleted or substituted.

According to one aspect of the present invention, a method for use in mapping an OCR text string to a particular code associated with one or more text strings included in a coding dictionary includes the step of comparing the OCR text string with a selected text string from the coding dictionary. The OCR text string may, for example, be received from a database including a plurality of OCR text strings obtained from one or more previously scanned and OCR processed documents or from an OCR software engine as the OCR software engine processes a document. The document may, for example, be a survey form having respondent information entered thereon.

A modified Levenshtein distance associated with the comparison is computed using substitution, insertion and deletion penalties associated with the comparison determined from OCR specific penalty matrices. In this regard, the Levenshtein distance is dynamically adjusted in accordance with each of the substitution, insertion, and deletion penalties.

The method (e.g., comparing the OCR text string using a modified version of the LDA to determine substitution, insertion, and deletion penalties from OCR specific matrices to adjust the Levenshtein distance) may be performed for more than one of the text strings (e.g., a subset) included in the coding dictionary. Thereafter, the text string included in the coding dictionary having the lowest modified Levenshtein distance may be selected as the best matching text string, and the code associated with the best matching text string may be assigned to a data field associated with the OCR text string given that the calculated modified Levenshtein distance falls below an acceptable maximum threshold value. Otherwise, a null or no code may be assigned. In this manner, the OCR text string is mapped to a code.

The substitution, insertion and deletion penalties may be determined in a number of manners. The substitution penalty may, for example, be determined by identifying instances in the OCR text string where one character is substituted in the OCR text string for a different character in the selected text string, and, for each identified instance of a substituted character in the OCR text string, a penalty value from a matrix of substitution penalty values may be applied. The insertion penalty may, for example, be determined by identifying instances in the OCR text string where a character is inserted between characters in the selected text string, and, for each identified instance of an inserted character in the OCR text string, a penalty value from a matrix of insertion penalty values may be applied. The deletion penalty may, for example, be determined by identifying instances in the OCR text string where a character is deleted from the selected text string, and, for each identified instance of a deleted character in the OCR text string, a penalty value from a matrix of deletion penalty values may be applied.

The method may further include receiving one or more alternatives for characters in the OCR text string. Comparison of the OCR text string and computation of a modified Levenshtein distance using substitution, insertion, and deletion penalties are performed for each of the alternatives for the OCR text string to obtain a separate modified Levenshtein distance associated with each of the alternatives for the OCR text string. Thereafter, the modified Levenshtein distances associated with each of the alternatives for the OCR text string are weighted based on the confidence level of the backup characters and/or a number of backup characters included in the alternative and/or the particular characteristics of the backup characters (e.g., whether all alternative characters are ascenders or descenders).

According to another aspect of the present invention, a system for mapping OCR text strings to a code associated with one or more text strings included in a coding dictionary includes a data storage device having the coding dictionary stored therein and a processor. In this regard, the system may, for example, be implemented within a single computer or within multiple computers interconnected with one another via, for example, a local area network or a wide area network.

The processor is enabled to access the coding dictionary from the data storage device and is operable to receive the OCR text strings to be mapped. In this regard, the OCR text strings may be received by the processor from a number of sources including, for example, from a database of previously scanned and OCR processed text or in real time from OCR software as text is scanned. The processor is operable to select at least a subset of the text strings from the coding dictionary and to compare the OCR text strings with each of the selected text strings from the coding dictionary. The processor is also operable to compute modified Levenshtein distances associated with each of the comparisons of the OCR text strings with the selected text strings from the coding dictionary using substitution, insertion, and deletion penalties associated with each of the comparisons of the OCR text strings with the selected text strings from the coding dictionary, with the penalties being obtained from OCR specific penalty matrices. In this regard, the substitution penalty may comprise a sum of numeric penalties associated with each instance in the OCR text string where one character is substituted in the OCR text string for a different character in the selected text string, the insertion penalty may comprise a sum of numeric penalties associated with each instance in the OCR text string where a character is inserted between characters in the selected text string, and the deletion penalty may comprise a sum of numeric penalties associated with each instance in the OCR text string where a character is deleted from the selected text string. The substitution, insertion and deletion penalties may be combined by the processor to obtain the modified Levenshtein distance.

The processor is additionally operable to select the text string included in the coding dictionary having the lowest modified Levenshtein distance as the best matching text string for each of the OCR text strings and to assign the code associated with the best matching text string to a data field associated with the OCR text strings given that the modified Levenshtein distance falls below a maximum distance threshold.

Where the OCR text strings comprise multiple alternative characters for the same scanned text, the processor may further be operable to weight the modified Levenshtein distance associated with each of the alternatives for the OCR text strings based on the confidence level of the alternative and/or a number of backup characters included in the alternative and/or the particular characteristics of the backup characters.

These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which:

FIG. 2 illustrates one example of a partial substitution penalty matrix;

FIG. 3 illustrates one example of a partial insertion penalty matrix;

FIG. 4 illustrates one example of a partial deletion penalty matrix;

DETAILED DESCRIPTION

Figure 1A:
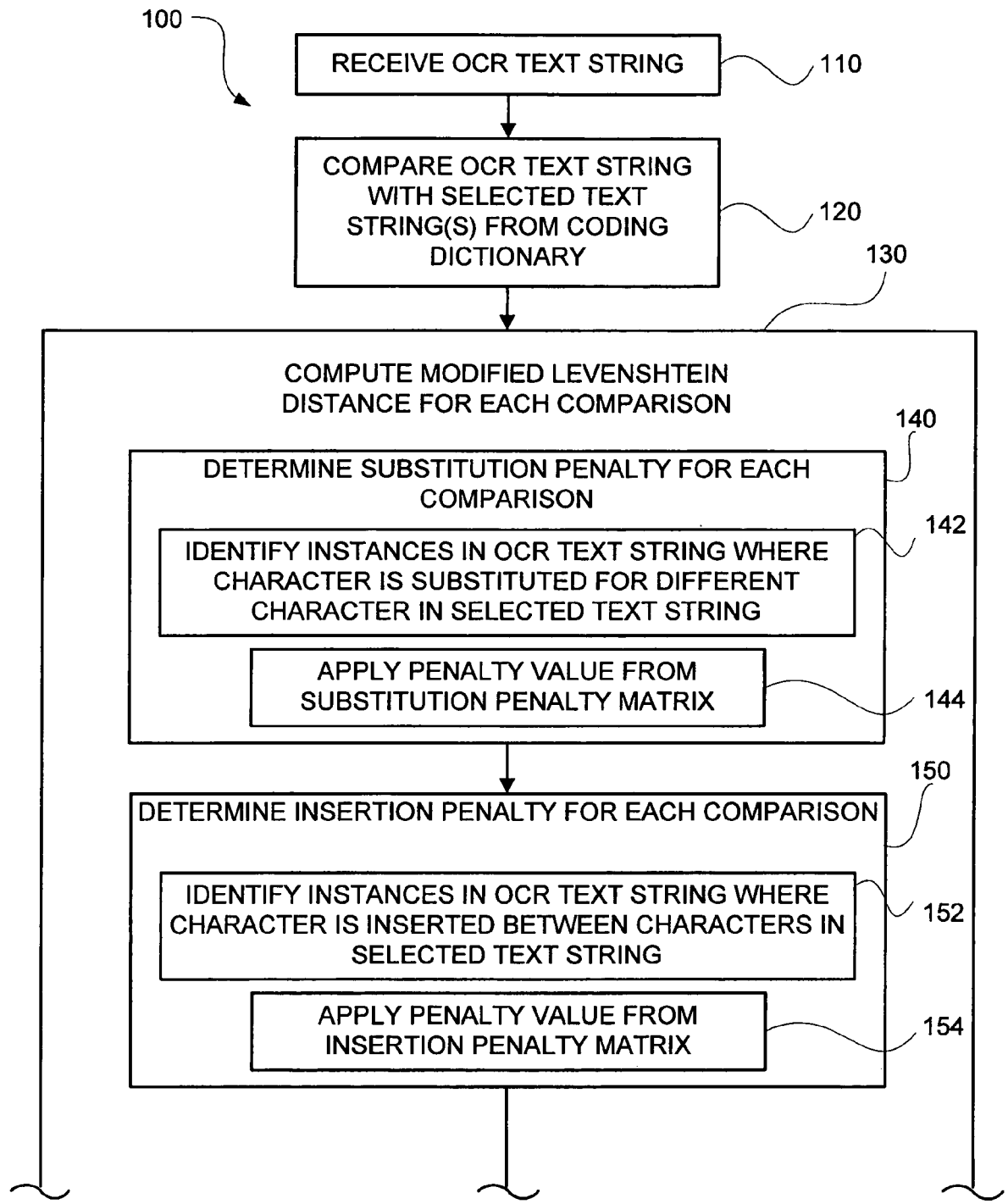
FIGS. 1A-1B illustrate one embodiment of an OCR text string mapping method.
Figure 1B:
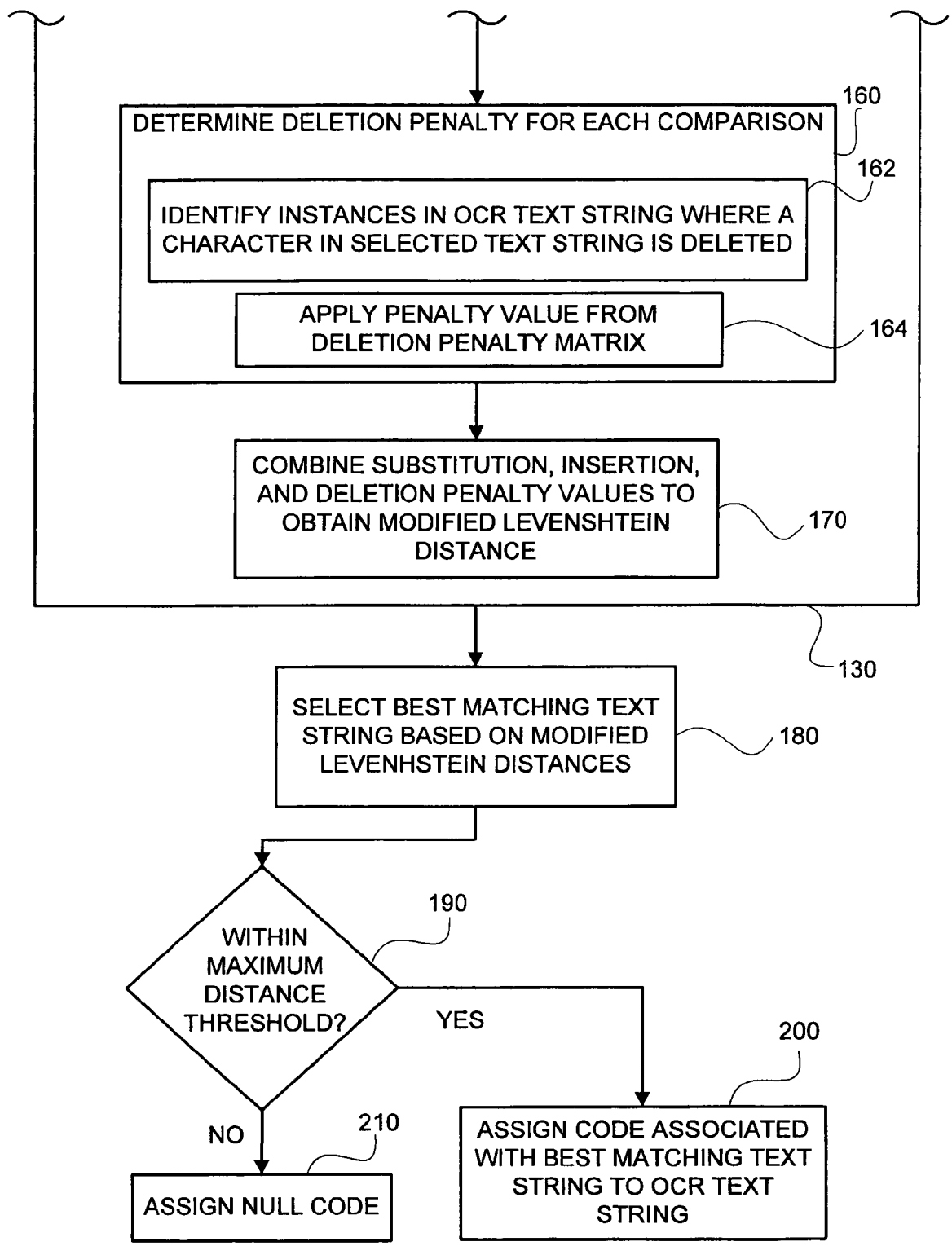

FIGS. 1A-1B show the steps included in one embodiment of a method (100) of mapping an OCR text string to a code associated with one or more text strings included in a coding dictionary. The OCR text string mapping method (100) illustrated in FIGS. 1A-1B is useful in a number of contexts including, for example, in categorizing information included in a document (e.g., a census survey form). For example, the following responses on a census survey form regarding a person's residence city are spelled differently but should map to the same category in the coding dictionary:

| Exemplary OCR Text String | Exemplary Associated Code |
|---|---|
| GREENWOOD VILLAGE | 99 |
| GREENWOOD VLG. | 99 |

-continued

| Exemplary OCR Text String | Exemplary Associated Code |
|---|---|
| GREEN. VILLAGE | 99 |
| GREEN. VLG. | 99 |

The exemplary code(s) illustrated above are numeric, but the code(s) may, in general, be numeric, alpha, or alpha-numeric code(s).

When conducting a large survey (e.g., a population census), it is not efficient to map responses on the census survey forms to codes in the coding dictionary by hand. Instead, the OCR text string mapping method (100) may be implemented in computer software and utilized to compare OCR text strings obtained from the census survey forms to various possibilities in the coding dictionary. Each comparison uses a modified version of the LDA to return a number representing a modified Levenshtein distance between the OCR text strings and the dictionary entries. The modified Levenshtein distance may also be referred to herein as the modified Levenshtein distance. The lower the modified Levenshtein distance the closer the scanned text is to the dictionary entry. The coding dictionary entry with the lowest modified Levenshtein distance when compared to the OCR text string most likely corresponds with the code to be used. In the desired case the characters in the OCR text string and a dictionary text string are identical resulting in a modified Levenshtein distance of zero. However, when aligning characters in the compared strings using LDA, a number of difficulties may be encountered. If the characters are not the same then a substitution, insertion or deletion may have occurred. The OCR text string mapping method (100) accounts for these possibilities by applying substitution, insertion or deletion penalties as appropriate when computing the modified Levenshtein distance.

The OCR text string mapping method (100) begins with receiving (110) an OCR text string. The OCR text string may be received from a number of sources such as, for example, from a database in which OCR text strings obtained from previously scanned and OCR processed survey forms are stored. The OCR text string may also, for example, be received in real time from an OCR software engine as the OCR software engine processes a scanned survey form. The OCR text string may be any number of characters long.

The OCR text string is compared (120) with one or more text strings from the coding dictionary. In this regard, although the OCR text string may be compared with all of the text strings in the coding dictionary, the OCR text string can be compared only with a subset of text strings from the coding dictionary that are relevant to the category of information represented by the OCR text string in order to provide accelerated processing. For example, where the OCR text string represents information relating to a person's residence city, then the OCR text string might only be compared with a subset of text strings from the coding dictionary comprising possible entries for a person's residence city; whereas, where the OCR text string represents information relating to a person's ethnicity, then the OCR text string might only be compared with a subset of text strings from the coding dictionary comprising possible entries for a person's ethnicity.

A modified Levenshtein distance is computed (130) for each of the comparisons made in the comparing step (120). In this regard, the Levenshtein distance for each comparison that is made of the OCR text string with one of the text strings in the coding dictionary may be computed by identifying character changes, character insertions, and character deletions necessary to make the OCR text string the same as the text string from the coding dictionary. More particularly, computation (130) of the modified Levenshtein distance involves the sub-steps of determining substitution, insertion and deletion penalties (140, 150, 160) corresponding with each of the identified character substitutions, insertions and deletions.

A substitution penalty is determined (140) for each of the comparisons made in the comparing step (120). In this regard, each of the associated substitution penalties may be determined by identifying (122) instances in the OCR text string where one character is substituted in the OCR text string for a different character in the text string from the coding dictionary. For each identified instance of a substituted character in the OCR text string, a penalty value from a matrix of substitution penalty values is applied (124).

As illustrated in FIG. 2, the matrix 240 of substitution penalties may comprise a plurality of numeric values 242 cross-referenced against a row of possible coding dictionary characters 244 and a column of possible OCR text string characters 246. It should be noted that FIG. 2 only shows a partial substitution penalty matrix 240 and in practice an actual substitution penalty matrix will be much larger (e.g., where 128 possible characters are included in the coding dictionary and recognized by the OCR software, the matrix will be 128×128). The boxes in the exemplary substitution penalty matrix 240 of FIG. 2 show the penalty applied for each of the possible character substitutions. For example, in the instance where the OCR text string includes an "L" at a particular position in the OCR text string but the text string from the coding dictionary includes an "I" at that position, a penalty of 0 is applied. This is because OCR software frequently incorrectly reads these characters. However, in the instance where the OCR text string includes an "L" at a particular position in the OCR text string but the text string from the coding dictionary includes a "K" at that position, then a penalty of 3 is applied. This is because an "L" is not commonly mistaken for a "K" by OCR software and the infrequency of such mistake is reflected by the larger penalty value. The aforementioned substitution penalty values are exemplary, and different penalty values may be used depending on the application.

Referring again to FIGS. 1A-1B, an insertion penalty is also determined (150) for each of the comparisons made in the comparing step (120). In this regard, each of the associated insertion penalties may be determined by identifying (152) instances in the OCR text string where a character is inserted between adjacent characters in the text string from the coding dictionary. For each identified instance of an inserted character in the OCR text string, a penalty value from a matrix of insertion penalty values is applied (154).

As illustrated in FIG. 3, the matrix 350 of insertion penalties may comprise a plurality of numeric values 352 indexed against a row of possible inserted characters 354. It should be noted that FIG. 3 only shows a partial insertion penalty matrix 350 and in practice an actual insertion penalty matrix will be much larger (e.g., where 128 possible characters are included in the coding dictionary and recognized by the OCR software, the matrix will be 1×128). The boxes in the exemplary insertion penalty matrix 350 of FIG. 3 show the penalty applied for each of a number of possible character insertions. By way of example, where OCR software recognized text on a census survey form as: "GREEN.WORD VILL.AGE" and such text is compared with the text string "GREENWOOD VILLAGE" from the coding dictionary, a total insertion penalty of 2 would be applied for the period inserted between the "N" and the "W" in "GREENWOOD" and the period inserted between the second "L" and the "A" in "VILLAGE". The exemplary insertion penalty matrix shown in FIG. 3 does not treat all possible character insertions the same. More particularly, if all possible character insertions had the same numeric penalty value (e.g., 5), the OCR text string would be given a Levenshtein distance of 10 which might more likely lead to inaccurate results in determining the best match from the coding dictionary. The aforementioned insertion penalty values are exemplary, and different penalty values may be used depending on the application.

Referring again to FIGS. 1A-1B, a deletion penalty is also determined (160) for each of the comparisons made in the comparing step (120). In this regard, each of the associated deletion penalties may be determined by identifying (162) instances in the OCR text string where a character is deleted from the text string from the coding dictionary. For each identified instance of a deleted character in the OCR text string, a penalty value from a matrix of deletion penalty values is applied (164).

As illustrated in FIG. 4, the matrix 460 of deletion penalties may comprise a plurality of numeric values 462 indexed against a row of possible deleted characters 464. It should be noted that FIG. 4 only shows a partial deletion penalty matrix 460 and in practice an actual deletion penalty matrix will be much larger (e.g., where 128 possible characters are included in the coding dictionary and recognized by the OCR software, the matrix will be 1×128). The boxes in the exemplary deletion penalty matrix 460 of FIG. 4 show the penalty applied for each of the possible deleted characters. By way of example, where OCR software recognized text on a census survey form as: "GREENWOOD VLG" and such text is compared with the text string "GREENWOOD VLG." from the coding dictionary, a total deletion penalty of 1 would be applied for the period missing from the OCR text at the end of "VLG". The exemplary deletion penalty matrix shown in FIG. 4 does not treat all possible character deletions the same. More particularly, if all possible character deletions had the same numeric penalty value (e.g., 5), the OCR text string would be given a Levenshtein distance of 5 which might more likely lead to inaccurate results in determining the best match from the coding dictionary. The aforementioned deletion penalty values are exemplary, and different penalty values may be used depending on the application.

Referring again to FIGS. 1A-1B, the modified Levenshtein distance for each of the comparisons is obtained by combining (170) the applicable substitution, insertion and deletion penalties determined in steps (140, 150, 160) for each of the comparisons. In this regard, the substitution, insertion and deletion penalties may simply be added together to obtain the modified Levenshtein distance associated with each of the text strings from the coding dictionary (or subset thereof) for which a comparison is made in step (120). It is also possible to combine the substitution, insertion and deletion penalties in other manners (e.g., subtraction, multiplication, division, etc.) to obtain the modified Levenshtein distance.

Thereafter, the text string from the coding dictionary (or the subset thereof) that best matches the OCR text string is selected (180). In this regard, the best matching text string may be selected based on which of the text strings for which comparisons are made in step (120) has the lowest associated modified Levenshtein distance computed in step (130) in accordance with the applicable substitution, deletion and insertion penalties are determined in sub-steps (140, 150, and 160). In step (190), a determination is made as to whether or not the modified Levenshtein distance of the best matching text string selected in step (170) is within a maximum allowed Levenshtein distance threshold. If so, then in step (200), the code associated in the coding dictionary with the best matching text string may then be assigned to a data field (e.g., in the database) that is associated with the OCR text string thereby mapping the OCR text string to a particular code, and if not, then in step (210) a null or no code may be assigned indicating that a best matching text string having an associated modified Levenshtein distance below the maximum distance threshold was not found for the text string received in step (110).

Figure 5A:
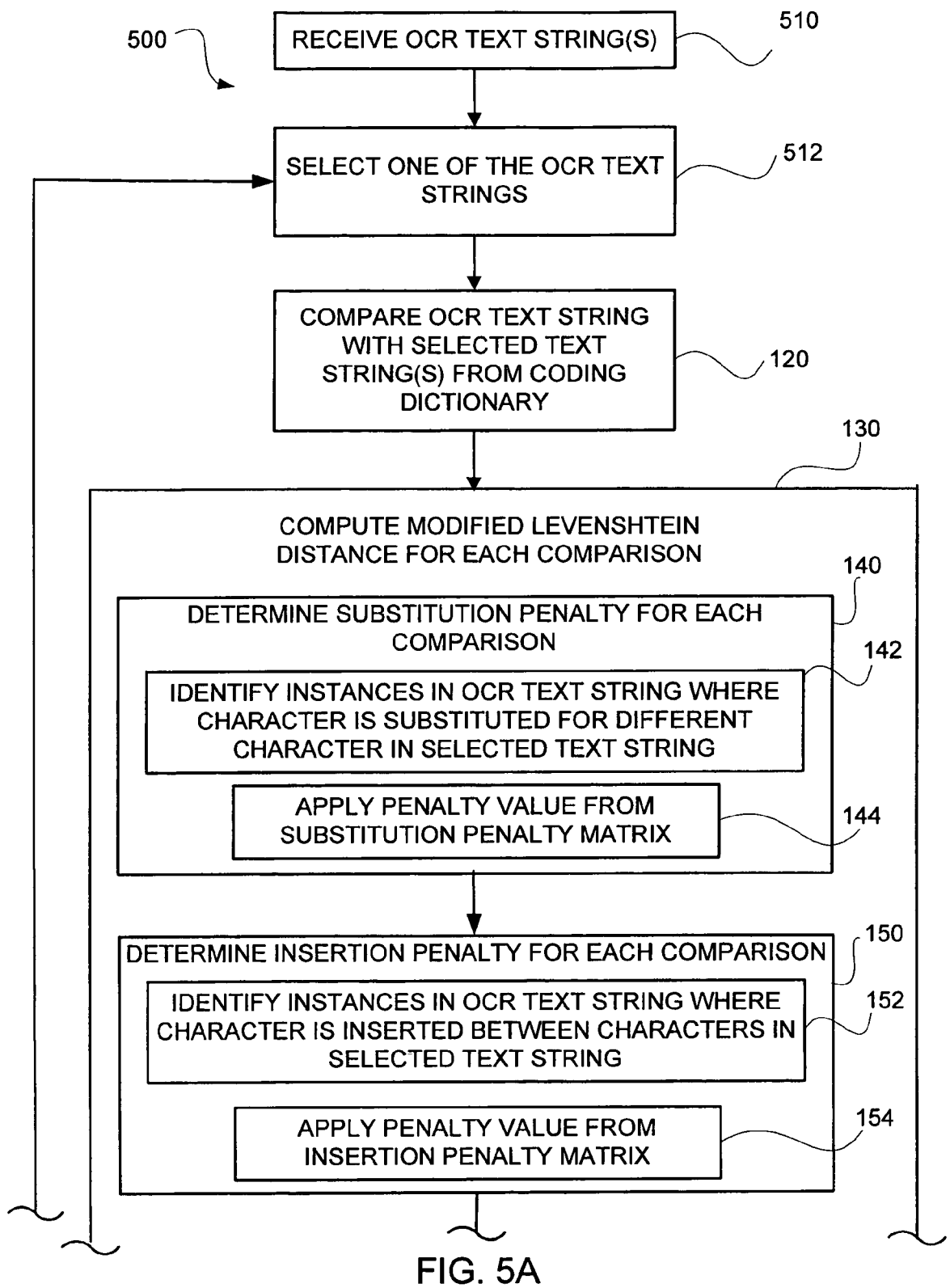
FIGS. 5A-5B illustrate another embodiment of an OCR text string mapping method in accordance with the present invention.
Figure 5B:
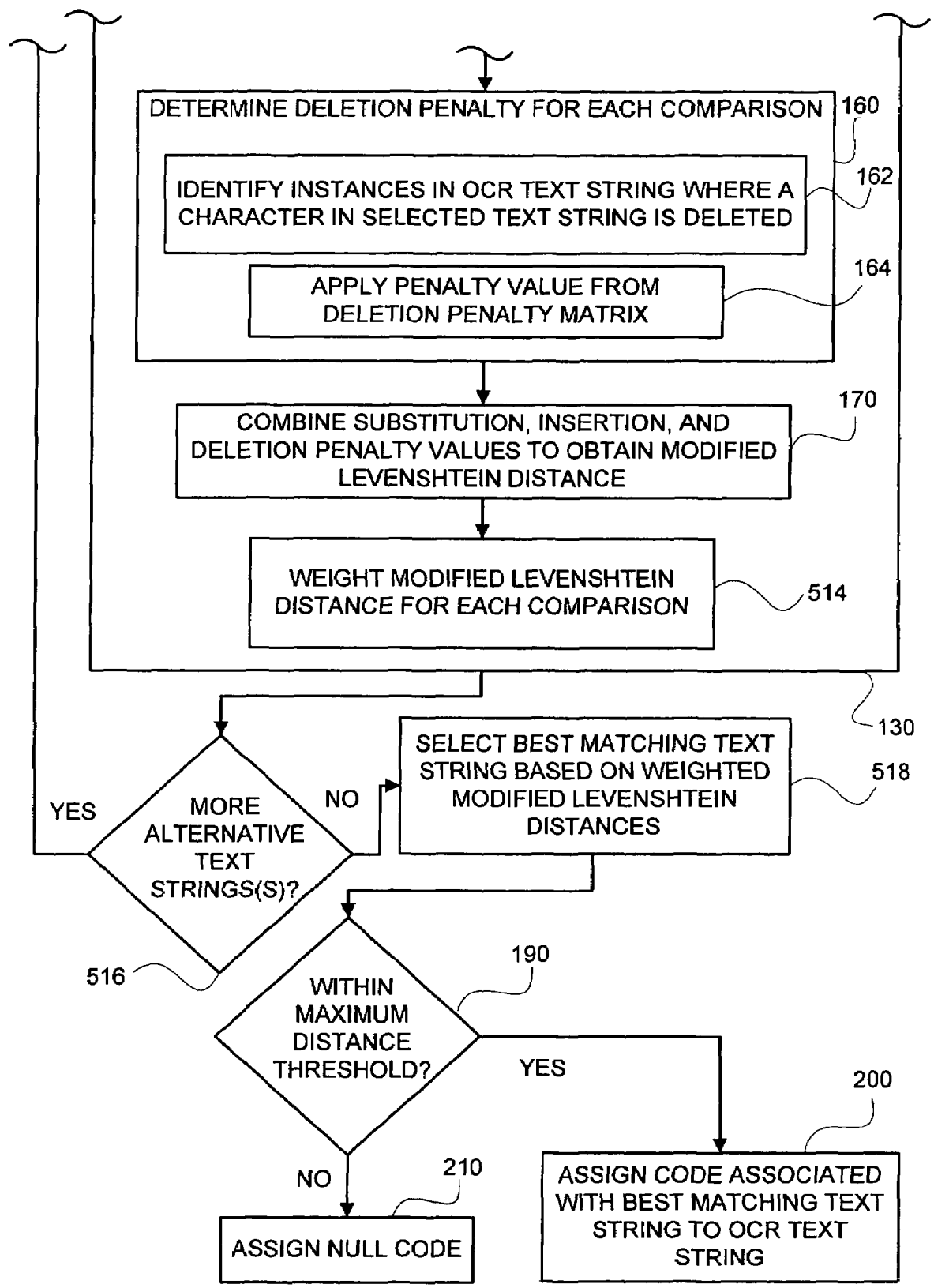

Referring now to FIGS. 5A-5B, there is shown another embodiment of a method (500) of mapping an OCR text string to a code associated with one or more text strings included in a coding dictionary. The method (500) of FIGS. 5A-5B is similar to the method (100) shown in FIGS. 1A-1B and the same reference numerals are used to refer to similar steps. The method (500) shown in FIGS. 5A-5B enhances the method (100) shown in FIGS. 1A-1B by using the backup characters that may be supplied in certain circumstances by the OCR software when scanning the survey forms. In this regard, where the OCR software does not scan a character with high confidence, it may be designed to supply substitutes for alternative consideration. By way of example, the OCR software might incorrectly recognize an entry on a survey form as "GPEENWOCD VILZACE" when it is clear that the correct text should be "GREENWOOD VILLAGE". However, the OCR software may not have a great deal of confidence in a number of the characters, and it may supply the following backup character choices in addition to the first choice. For example:

| Choice 1: | G P E E N W O C D V I L Z A C E |
| Choice 2: | R          O        V    G |
| Choice 3: |                            L |

The method (500) begins with receiving (510) a first choice OCR text string and, when available from the OCR software, a number of alternative choices (e.g., first, second, third, etc. choices). The OCR text string(s) received correspond with a single text string entered, for example, on a survey form. The OCR text string(s) may be any number of characters long, and may be received from a number of sources (e.g., from a database in which OCR text strings obtained from previously scanned and OCR processed survey forms are stored or in real time from an OCR software engine as the OCR software engine processes a scanned survey form).

When multiple OCR text strings are available, one of the OCR text strings (e.g., the first choice) is selected (512) and then the method (500) processes the selected OCR text string as per steps (120) through (170) of the method (100) shown in FIG. 1. In this regard, the selected OCR text string is compared (120) with one or more text strings selected from a coding dictionary and then, for each comparison, a modified Levenshtein distance is computed (130) by combining (170) substitution, deletion, and insertion penalties determined in sub-steps (140, 150, and 160).

The modified Levenshtein distance computed in step (130) in accordance with the applicable penalties from the matrices is appropriately weighted (514) based on characteristics of the backup characters. In this regard, utilizing backup characters improves the chances that a correct or nearly correct match will be found in the coding dictionary, but by using backup characters, it is possible that an exact or nearly exact match (e.g., a Levenshtein distance of zero or nearly zero) might be found for more than one possibility. However, in accordance with the method (500), the modified Levenshtein distance obtained in step (130) may be weighted by the number of backup characters used and their respective backup position (e.g., first choice, second choice, etc.) and also by particular characteristics of the backup characters (e.g., whether the characters are ascenders or descenders). Using a weighted modified Levenshtein distance avoids ties where first choice characters match exactly as well as second, third, etc. choice characters. Weighting the modified Levenshtein distance in accordance with the level and number of backup characters enables responses to be accepted as correct with a much higher confidence than without the use of backup characters.

Thereafter, in step (516) it is determined whether there are more alternative OCR text strings to be processed. If so, the method (500) returns to step (512) and the next choice is selected for further processing. If all of the alternative OCR text strings received in step (510) have been processed, the method (500) then proceeds to step (518). In step (518), the text string from the coding dictionary (or the subset thereof) that best matches the OCR text string is selected. In this regard, the best matching text string may be selected (518) based on which of the text strings has the lowest associated weighted modified Levenshtein distance. In this regard, the weighted modified Levenshtein distances for all of the comparisons for all of the choices processed are considered. Thereafter, in step (190), a determination is made as to whether or not the weighted modified Levenshtein distance of the best matching text string selected in step (518) is within a maximum allowed Levenshtein distance threshold. If so, then in step (200), the code associated in the coding dictionary with the best matching text string may then be assigned to a data field (e.g., in the database) that is associated with the OCR text string thereby mapping the OCR text string to a particular code, and if not, then in step (210) a null or no code may be assigned indicating that a best matching text string having an associated modified Levenshtein distance below the maximum distance threshold was not found for the text string(s) received in step (510).

Figure 6:
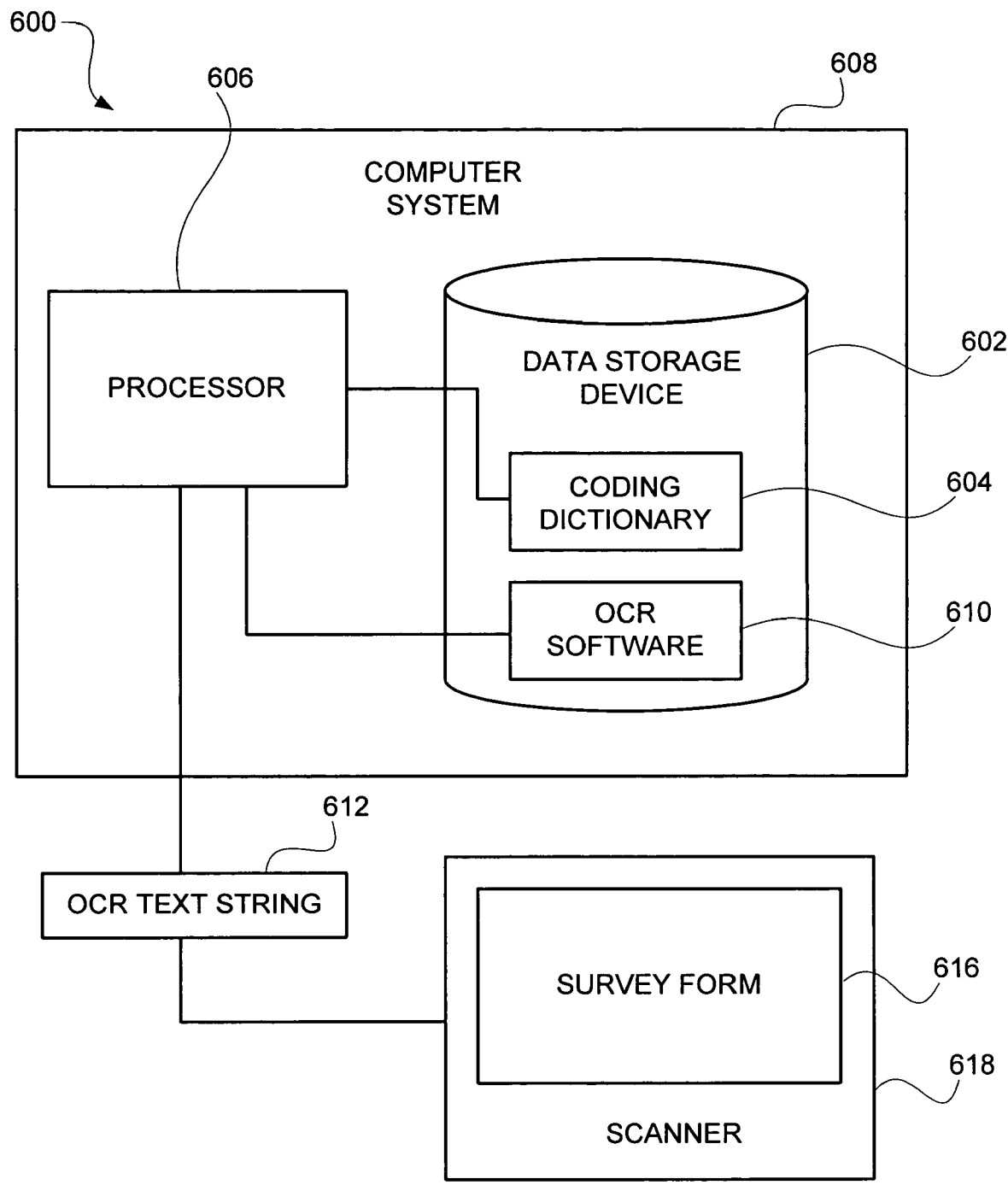
FIG. 6 illustrates one embodiment of a system operable to map OCR text strings.

FIG. 6 shows one embodiment of a system 600 that operates to map optical character recognition (OCR) text strings to codes associated with text strings included in a coding dictionary. The system 600 includes a data storage device 602 having the coding dictionary 604 stored therein and a processor 606 enabled to access the coding dictionary from the data storage device. As is illustrated, data storage device 602 and processor 606 may be part of a computer system 608 (e.g., a desktop or laptop computer system). However, in other embodiments, data storage device 602 and processor 606 may be included in separate computer systems in communication with one another via a local area network and/or a wide area network.

The processor 606 (e.g., via a software program 610 stored on the data storage device 602) receives an OCR text string 612 that is to be mapped to one of the codes associated with the text strings in the coding dictionary 604. In the illustrated embodiment, the OCR text string 612 is received in real time from an OCR software engine 614 as the OCR software engine 614 scans, for example, a completed survey form 616 using a scanner 618 connected to the computer system 608 and processes the scanned survey form 616 to generate the OCR text string 612 corresponding to an entry on the survey form 616. In other embodiments, the OCR text string 612 may be received from other sources such as, for example, from a database in which OCR text strings obtained from previously scanned and OCR processed survey forms are stored.

The processor 606 selects a subset of the text strings from the coding dictionary 604 and compares the OCR text string 612 with each of the selected text strings from the coding dictionary 604. For each comparison, the processor 606 computes a modified Levenshtein distance using applicable substitution, insertion, and deletion penalties. In this regard, the modified Levenshtein distance may be computed as described above in connection with the method of FIGS. 1A-1B. The processor 606 may also weight the modified Levenshtein distance where multiple choices are received from the OCR software 614 as described above in connection with the method of FIGS. 5A-5B. The processor 606 then selects the text string included in the coding dictionary having the lowest modified (and weighted) Levenshtein distance as the best matching text string, determines whether it is below a maximum threshold value, and assigns the code associated with the best matching text string from the coding dictionary 604 to a data field associated with the OCR text string 612 if within the threshold or a null code if the maximum distance threshold is exceeded.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A method for use in mapping an optical character recognition (OCR) text string to a code from a coding dictionary, each code being associated with at least one of a plurality of text strings included in the coding dictionary, said method comprising the steps of:

receiving the OCR text string at a processor;

receiving, when available, one or more alternatives for the OCR text string at the processor, wherein the alternatives include at least one backup character;

executing a software program with the processor, wherein executing the software program includes the steps of:

comparing the OCR text string with a selected text string from the coding dictionary;

computing a modified Levenshtein distance associated with the comparison made in said step of comparing, wherein said step of computing includes:

determining a substitution penalty by identifying instances in the OCR text string where one character is substituted in the OCR text string for a different character at a corresponding position in the selected text string, and, for each identified instance of a substituted character in the OCR text string, by applying a numerical penalty value from a matrix of substitution penalty values, wherein the numerical penalty values in the matrix of substitution penalty values vary according to which character is substituted in the OCR text string for a different character at the corresponding position in the selected text string;

determining an insertion penalty by identifying instances in the OCR text string where a character is inserted between characters in the selected text string, and, for each identified instance of an inserted character in the OCR text string, by applying a numerical penalty value from a matrix of insertion penalty values, wherein the numerical penalty values in the matrix of insertion penalty values vary according to the character that has been inserted;

determining a deletion penalty by identifying instances in the OCR text string where a character is deleted from the selected text string, and, for each identified instance of a deleted character in the OCR text string, by applying a penalty value from a matrix of deletion penalty values, wherein the numerical penalty values in the matrix of deletion penalty values vary according to the character that has been deleted; and combining each of the substitution penalty, the insertion penalty, and the deletion penalty to determine the modified Levenshtein distance;

performing, when one or more alternatives for the OCR text string are received, said steps of comparing the OCR text string and computing a modified Levenshtein distance for each of the alternatives for the OCR text string to obtain a separate modified Levenshtein distance associated with each of the alternatives for the OCR text string;

weighting the modified Levenshtein distance associated with each of the alternatives for the OCR text string differently according to at least one of a level of the alternative, the number of backup characters included in the alternative, and characteristics of the at least one backup character; and selecting the text string included in the coding dictionary having the lowest weighted modified Levenshtein distance as the best matching text string for the OCR text string.

2. The method of claim 1 wherein said step of executing the software program further includes the steps of:

performing said steps of comparing the OCR text string, computing a modified Levenshtein distance, and weighting the modified Levenshtein distance for each of at least a subset of the text strings included in the coding dictionary.

3. The method of claim 2 wherein said step of executing the software program further includes the steps of:

determining whether the lowest weighted modified Levenshtein distance is within a maximum distance threshold;

assigning the code associated with the best matching text string to the OCR text string when the lowest weighted modified Levenshtein distance is within the threshold; and assigning a null code to the OCR text string when the lowest weighted modified Levenshtein distance exceeds the threshold.

4. The method of claim 1 wherein, in said step of receiving at a processor, the OCR text string is received from a database including a plurality of OCR text strings obtained from one or more previously scanned and OCR processed documents or is received from an OCR software engine as the OCR software engine processes a document.

5. A system for mapping optical character recognition (OCR) text strings to a code from a coding dictionary, each code being associated with at least one of a plurality of text strings included in the coding dictionary, said system comprising:

a data storage device having the coding dictionary stored therein; and a processor enabled to access the coding dictionary from the data storage device, the processor being operable to:

receive the OCR text strings to be mapped, wherein said OCR text strings comprise multiple alternatives for the same scanned text and wherein the alternatives include at least one backup character;

select at least a subset of the text strings from the coding dictionary;

compare each of the OCR text strings with each of the selected text strings from the coding dictionary;

compute modified Levenshtein distances associated with each of the comparisons of the OCR text strings with the selected text strings from the coding dictionary by combining a substitution penalty, an insertion penalty, and a deletion penalty associated with each of the comparisons of the OCR text strings with the selected text strings from the coding dictionary, said substitution penalty comprising a sum of numeric substitution penalties associated with each instance in the OCR text string where one character is substituted in the OCR text string for a different character at a corresponding position in the selected text string, wherein the numeric substitution penalties are specified in a matrix of substitution penalties comprising a plurality of numeric values that vary according to which character is substituted in the OCR text string for a different character at the corresponding position in the selected text string, said insertion penalty comprising a sum of numeric insertion penalties associated with each instance in the OCR text string where a character is inserted between characters in the selected text string, wherein the numeric insertion penalties are specified in a matrix of insertion penalties comprising a plurality of numeric values that vary according to the character that has been inserted, and said deletion penalty comprising a sum of numeric deletion penalties associated with each instance in the OCR text string where a character is deleted from the selected text string, wherein the numeric deletion penalties are specified in a matrix of deletion penalties comprising a plurality of numeric values that vary according to the character that has been deleted;

weight the modified Levenshtein distance associated with each of the alternatives for the OCR text strings differently according to at least one of a level of the alternative, the number of backup characters included in the alternative, and characteristics of the at least one backup character;

select the text string included in the coding dictionary having the lowest weighted modified Levenshtein distance as the best matching text string for each of the OCR text strings;

determine whether the lowest weighted modified Levenshtein distance is within a maximum distance threshold;

assign the code associated with the best matching text string to the OCR text string when the lowest weighted modified Levenshtein distance is within the threshold; and assign a null code to the OCR text string when the lowest weighted modified Levenshtein distance exceeds the threshold.

6. The system of claim 5 further comprising:

a database having the OCR text strings stored therein, the database being accessible by said processor.

7. The system of claim 5 further comprising:

an OCR software engine providing the OCR text strings to said processor in real time.

8. A system for mapping an optical character recognition (OCR) text string to a code from a coding dictionary, each code being associated with at least one of a plurality of text strings included in the coding dictionary, said system comprising:

means for comparing the OCR text string with a selected text string from the coding dictionary;

means for determining a substitution penalty, an insertion penalty, and a deletion penalty, said substitution penalty comprising a sum of numeric substitution penalties associated with each instance in the OCR text string where one character is substituted in the OCR text string for a different character at a corresponding position in the selected text string, wherein the numeric substitution penalties are specified in a matrix of substitution penalties comprising a plurality of numeric values that vary according to which character is substituted in the OCR text string for a different character at the corresponding position in the selected text string, said insertion penalty comprising a sum of numeric insertion penalties associated with each instance in the OCR text string where a character is inserted between characters in the selected text string, wherein the numeric insertion penalties are specified in a matrix of insertion penalties comprising a plurality of numeric values that vary according to the character that has been inserted, and said deletion penalty comprising a sum of numeric deletion penalties associated with each instance in the OCR text string where a character is deleted from the selected text string, wherein the numeric deletion penalties are specified in a matrix of deletion penalties comprising a plurality of numeric values that vary according to the character that has been deleted;

means for computing a modified Levenshtein distance associated with the comparison by combining each of the substitution, insertion and deletion penalties;

means for receiving one or more alternatives for the OCR text string, wherein the alternatives include at least one backup character;

means for comparing each alternative for the OCR text string with a selected text string from the coding dictionary;

means for determining a substitution penalty, an insertion penalty, and a deletion penalty associated with each of the alternatives for the OCR text string;

means for computing a modified Levenshtein distance associated with each of the alternatives for the OCR text string by combining each of the substitution, insertion and deletion penalties;

means for weighting the modified Levenshtein distance associated with each of the alternatives for the OCR text string differently according to at least one of a level of the alternative, the number of backup characters included in the alternative, and characteristics of the at least one backup character; and means for selecting the text string included in the coding dictionary having the lowest weighted modified Levenshtein distance as the best matching text string for the OCR text string.

9. The system of claim 8 wherein said means for comparing, said means for computing, and said means for determining comprise a computer processor.

10. The system of claim 8 further comprising means for storing the OCR text string and the coding dictionary.

11. The system of claim 10 wherein said means for storing comprise a data storage device of a computer system.

* * * * *

UNITED STATES PATENT AND TRADEMARK OFFICE
CERTIFICATE OF CORRECTION

PATENT NO.      : 7,664,343 B2                                              Page 1 of 1
APPLICATION NO. : 11/338506
DATED           : February 16, 2010
INVENTOR(S)     : Withum et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 887 days.

Signed and Sealed this

Fourth Day of January, 2011

David J. Kappos
*Director of the United States Patent and Trademark Office*